Feb. 19, 1963 L. R. PADBERG, JR 3,077,944
PNEUMATIC SOUND SOURCE
Filed June 28, 1960 2 Sheets-Sheet 1

INVENTOR.
LOUIS R. PADBERG, JR.
BY
ATTORNEYS

INVENTOR.
LOUIS R. PADBERG, JR.
BY
ATTORNEYS

United States Patent Office

3,077,944
Patented Feb. 19, 1963

3,077,944
PNEUMATIC SOUND SOURCE
Louis R. Padberg, Jr., 4126 Middlesex Drive,
San Diego, Calif.
Filed June 23, 1960, Ser. No. 39,417
8 Claims. (Cl. 181—.5)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of application Serial No. 790,302, filed January 30, 1959, now abandoned, by the applicant herein.

This invention relates basically to a method and apparatus for generating a high pressure sound wave at a very low frequency, mainly for use in a liquid medium. More specifically, it covers a system for inflating an elastic enclosure underwater until it exceeds its elastic limit and explodes to produce a short sound pulse of the desired amplitude and having a low, single frequency.

In the past, sound waves have been created, especially in liquids, by means of vibrating diaphragms energized mainly by magnetostriction or piezoelectric principles. Such methods produce wave trains of very high frequency. Still another old method for producing an underwater sound wave is by the use of explosives such as TNT. In addition to the danger of handling the explosive, another disadvantage results from the gaseous expansion due to heat or temperature rise followed by an implosion. Although the explosion will product a wave of high intensity, at the same time the disadvantage of the explosive pulse is that it covers a broad band of frequencies, most of which must be filtered out to obtain a sharp signal.

In the proposed method, an elastic enclosure is calibrated for determining its inflatable volume at its elastic limit. The enclosure is then submerged and inflated beyond its elastic limit whereby it explodes to produce an underwater sound pulse of high amplitude, short duration, and of a predominantly single, low frequency.

An object of the invention is to produce a sound source of a very low frequency.

A further object is to produce a very low frequency sound source concentrated at a single frequency.

A further object is to produce a low frequency sound source of very high amplitude.

Another object of this invention is to provide a method for pneumatically generating a narrow band, low frequency sound wave underwater by means of controllable cavitation bubbles without temperature change.

Still another object of this invention is to provide a method for pneumatically producing a short duration, high amplitude underwater energy pulse concentrated at a single low frequency, by means of releasing a submerged, oscillating bubble of a controlled size and submergence.

A further object of this invention is to control the directivity of said short duration, high amplitude underwater energy pulse concentrated as a single low frequency.

Still another object is to provide means for automatically releasing said submerged oscillating bubble at any predetermined depth.

The original device preferably employed a spherically shaped elastic enclosure. As the art developed, the elastic enclosure took the shape of an elongated surgical tube in order to control the directivity of the pneumatic pulse. Further, the ordinary hand pole for holding the elastic enclosure at a limited depth was replaced by employing a depth bomb incorporating means for automatically inflating the elastic enclosure at a preselected underwater depth or hydrostatic pressure for releasing the pneumatic pulse isothermally at said depth. By the above related improvements the single low frequency sound pulse of high amplitude can be controlled in directivity and depth of origin.

A general object of this invention is to provide a method for generating an energy pulse at any selected depth underwater by means of an exploded elastic enclosure wherein the shape of the enclosure may control the directivity and frequency of the pulse. Such a method is suitable for geophysical prospecting, the study of earth material structure to obtain building foundation data, prospecting for underground water, oil or mineral deposits, for generating a high intensity timing signal, a power force for mechanical punches or stamping machines, for boat propulsion by means of creating cavitation bubbles, and various uses requiring a high intensity, short duration, narrow band, for frequency energy pulse source such as in antisubmarine warfare.

Other objects and many of the attendant advantages of this invention will be readily appreciated as the same becomes better understood by reference to the following detailed description when considered in connection with the accompanying drawings wherein.

In detail, the method for creating a controlled sound pulse, underwater, of predetermined characteristics, depends upon a calibrated elastic enclosure. Said enclosure may be of any shape or form such as an elongated tubing which inflates to a bologna shape or, the enclosure may be of a spherical shape when inflated. In any case the enclosures used must be of uniform material and size to produce an exploded bubble of predetermined characteristics, equivalent to those produced by a standard calibrated elastic enclosure of the same size when inflated to its elastic limit. The use of a uniform surgical rubber tubing sealed at its outboard end has been found to be a very desirable material for the enclosure. By choosing the tubing of the desired thickness, diameter, and length, the variation in bubble size can thus be basically controlled for reproducing numerous predetermined sound pulse characteristics.

Figure 1:
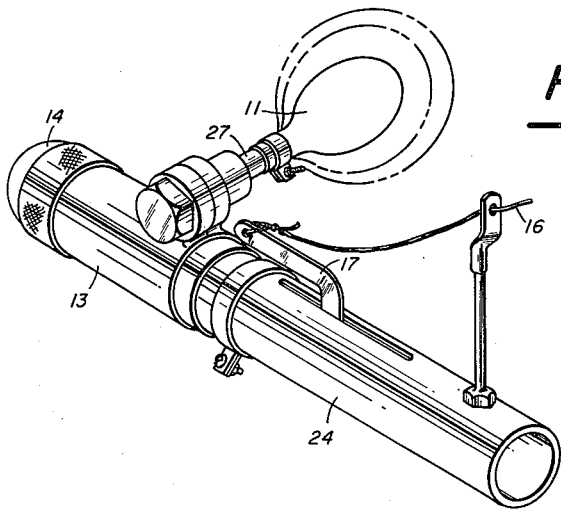
FIG. 1 is a perspective view of one type of apparatus for carrying out the proposed method for producing an underwater sound pulse.

However, the most common enclosure employed is one of spherical shape when inflated to its elastic limit. In FIG. 1, such a spherical elastic enclosure before inflation is indicated by numeral 11, and the degree of inflation as the pressure is increased is indicated by the broken lines.

Figure 2:
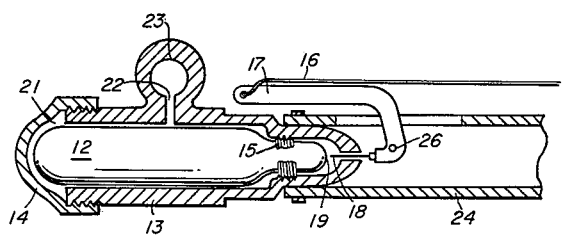
FIG. 2 is a front elevation partially in section along the longitudinal centerline of FIG. 1 showing the gas cartridge and piercing apparatus for releasing the inflating gas.

FIGS. 1 and 2 are illustrations of an apparatus employed in carrying out the proposed method for producing a short underwater sound pulse at a single, low frequency. A cartridge 12 containing compressed carbon dioxide or similar inflating medium, is fixed in position by the threaded portion 15 in a pressure-tight chamber 21 in housing 13 closed by cap 14 and submerged by means of a pole 24. Chamber 21 is connected by port 22 and orifice 23 to the inflatable elastic enclosure 11 through connection 27. The cartridge 12 is designed with a soft nose 19 adapted to be pierced by pin 18 whereby the gas contained under pressure in said cartridge 12 is released into the housing chamber 21. Said gas under pressure is thence directed by port 22 and orifice 23 to elastic enclosure 11 for inflating said enclosure beyond its elastic limit.

Since the above described operation takes place under water its action is triggered by manually pulling the lanyard 16 which in turn operates the bell crank 17 about pivot 26 to drive the pin 18 through the soft nose 19 of the cartridge 12 and thus release the inflating gas under pressure.

In operation, the method for producing the desired narrow band, low frequency sound pulse is based upon the empirical formula $$f = \frac{20\sqrt{P+34}}{d}$$

cycles per second wherein the term "$d$" is the diameter in inches of the plastic enclosure when inflated to its elastic limit. The term "$P$" equals the depth in feet below the surface to which the elastic enclosure has been submerged at the time of rupture at the elastic limit. For example, an elastic enclosure 11 is selected in accordance with dimensions of a sample producing the desired pulse. In case a spherical elastic enclosure is employed, its critical variable factor or dimension is in the diameter "$d$" at its elastic limit. Therefore the first step is to select the spherical enclosure having a diameter "$d$" at the point of rupture due to inflation. The next step is to submerge the enclosure to the specific depth required, namely "$P$" feet below the surface and then inflate the enclosure until it ruptures at its elastic limit and releases an oscillating bubble "$d$" inches in diameter. The inflation may be by high pressure capsule, by mouth, or any suitable means for producing the necessary gas pressure required.

A further object of this invention is to provide directivity at low frequencies. It can be accomplished with some degree of success by using the spherical elastic enclosure 11 as the pneumatic sound source and employing a reflector in combination therewith.

To obtain a fairly directive sound beam, the radiator should be about 3 wavelengths across. The basic formula for wavelength is:

$$\lambda \text{ ft.} = \frac{\text{Velocity in feet per second}}{\text{Frequency in cycles per second}}$$

For example, at a frequency of 1000 cycles per second and a sound velocity of 5000 feet per second, $\lambda = 5$ feet, and therefore the radiator should be about 15 feet across. By employing the elastic enclosure described above, a one inch sphere at a depth of about 3000 feet, the resulting oscillating bubble will have a frequency of about 1000 cycles per second, a preferred frequency for anti-submarine warefare. If this sphere is mounted at the focus of a large parabolic reflector 15 feet in diameter and the assembly lowered to the deep sound channel, a highly directive sound beam will result. Such a low frequency beam is capable of tremendous sound ranging. While such a reflector is large and difficult to handle its size is still within practical limits.

However, still another object of this invention is to provide an elastic enclosure designed especially for controlling the directivity without the use of a reflector. This is accomplished by a shaped elastic enclosure such as a long length of surgical rubber tubing FIG. 4 inflated underwater to a bologna shape. For example, experience has shown that a surgical rubber tube ⅜ inch outside diameter, 3/16 inch inside diameter and 3.7 feet long will inflate to approximately 15 feet in length before rupture at its elastic limit. If this tube 28 is inflated underwater isothermally and ruptured in the deep sound channel, a frequency of about 1000 cycles per second will result (using a sound velocity of 5000 feet per second). If the lower end of the tube 28 is sealed by a clip 29 to which a weight 30 and the tubular enclosure is inflated beyond its elastic limit from the upper end 31, then the sound wave will be radiated horizontally at right angles to the vertical longitudinal axis of the tube. Without any reflector the beam will be fairly narrow because of its natural dimension at rupture. By holding the tube in a horizontal position, the radiation directivity will be vertical toward the surface or ocean floor when this mode of radiation is desired.

A further object of this invention is to provide means for exploding or rupturing the elastic enclosures at a predetermined underwater depth or hydrostatic pressure. To accomplish this, the nose piece 32 and hydrostatic control mechanism of the explosive "Dept Charge (Practice) Mark 15 Mod. O" was modified for use on the acoustic bomb FIG. 5 employing the pneumatic sound source described above. The nose piece 32 and control mechanism Mark 15 of the original depth charge are old in the art and no novelty is claimed thereto. However, the Mark 15 tail piece carrying the explosive has been modified to adapt it for use with a pneumatic pressure source 37. The acoustic bomb is shown in FIG. 5 wherein the Mark 15 nose piece 32 and body 33 for housing the firing mechanism are illustrated in connection with the housing 34 containing the newly developed pneumatic apparatus shown in section connection to a spherical elastic enclosure 43.

Figure 4:
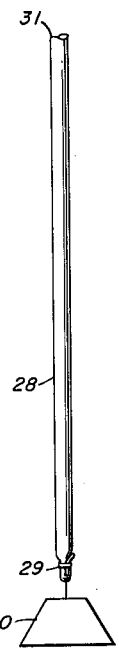
FIG. 4 illustrates an elongated elastic enclosure.
Figure 3:
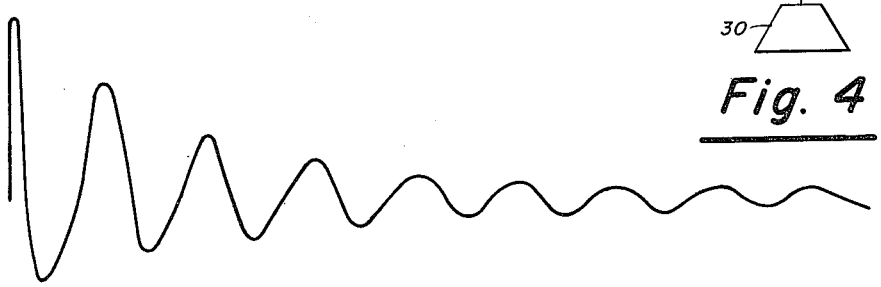
FIG. 3 is representative of a typical wave form from the pneumatic sound source.
Figure 5:
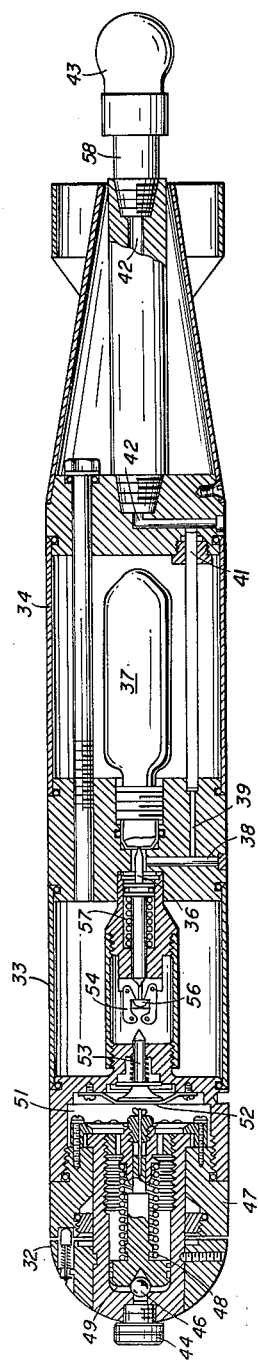
FIG. 5 is a front elevation partially in section along the centerline of a pneumatic depth charge assembly including a hydrostatic pressure reactive mechanism for controlling and firing the pneumatic depth charge.

The nose piece and triggering mechanism are shown in detail in FIG. 5 wherein the depth dial 47 is free to be manually rotated on the nose piece 32 in order to adjust the tension of dial spring 48 and retain the ball valve 46 against the hydrostatic pressure passage uncovered by plug 44. When valve 46 opens at the preset depth, the hydrostatic pressure is communicated through passage 49 to chamber 51 wherein diaphragm 52 is responsive to the pressure and in turn moves the piston 53 into contact with the latch mechanism 54 to operate the triggering mechanism. When the tapered point of piston 53 is forced into the latching mechanism 54 a sufficient distance, the head 56 of the firing pin 36 is released by the latching mechanism 54 thus permitting the firing pin 36 under the force of spring 57 to be driven into the soft nose of the pneumatic or gas pressure bottle 37 (FIG. 5) thereby releasing the pressure for inflating, and rupturing or exploding the elastic enclosure 43. When bottle 37 has been pierced by firing pin 36 the released gas is directed through passages 38, 39, 41, and 42, respectively, and connection 58 to the elastic enclosure 43, FIG. 5. The spherical elastic enclosure 11 or tubular enclosure 28 in FIG. 4 are adapted for use on the depth bomb shown in FIG. 5. In case tube 28, FIG. 4, is to replace the bulb 43, FIG. 5, the bomb itself would act as the weight 30 of FIG. 4 to maintain the tube in its vertical direction as it sinks in the water, thus providing directivity to the acoustic depth bomb explosion. The tube 28, in FIG. 4, is attached at its upper end 31 to connection 58, FIG. 5, in place of enclosure 43. The weight 30 is thus eliminated and the bomb substituted therefor. As is evident, when the tube 28 is attached to the bomb at 31 as described above, the formerly lower end 29 now becomes the upper end as the tube is drawn downward through the water.

What is claimed is:

1. The method of generating a high amplitude, short pulse acoustic wave in a liquid medium, said wave having a narrow band low frequency equal to $$\frac{20\sqrt{P+34}}{d}$$

per second where "$P$" is a predetermined depth in feet and "$d$" is a diameter in inches comprising:

(a) submerging an elastic enclosure in a liquid medium to a predetermined depth "$P$";

(b) directing a gas under pressure into said elastic enclosure at said depth "$P$" until said enclosure reaches a predetermined diameter "$d$" representing the elastic limit of the enclosure;

(c) and finally rupturing said enclosure at its elastic limit, isothermally, to release an oscillating bubble at said depth "$P$" having a frequency "$f$" equal to $$\frac{20\sqrt{P+34}}{d}$$

cycles per second.

2. The method of generating a high amplitude, short pulse acoustic wave in a liquid medium, said wave having a narrow band low frequency equal to $$\frac{20\sqrt{P+34}}{d}$$

per second where "$P$" is a predetermined depth in feet and "$d$" is a diameter in inches comprising:

(a) submerging an elastic enclosure in a liquid medium to a predetermined depth "$P$";

(b) directing a gas under pressure from an outside source into said elastic enclosure while submerged at said depth "$P$" until said enclosure reaches a predetermined diameter "$d$" representing the elastic limit of the enclosure;

(c) and increasing the gas pressure in said enclosure while maintaining said gas at a substantially uniform temperature during said increase in pressure to a point beyond the elastic limit of the enclosure thereby releasing an oscillating bubble at said depth "$P$" having a frequency "$f$" equal to $$\frac{20\sqrt{P+34}}{d}$$

cycles per second.

3. A high amplitude, short pulse, narrow band low frequency underwater sound generator comprising a spherical elastic enclosure having a diameter "$d$" in inches when inflated to its elastic limit, means supporting said enclosure for submerging said enclosure to a predetermined depth "$P$" feet and means connected to said enclosure for inflating said enclosure underwater isothermally at said depth of "$P$" feet to its elastic limit and rupturing the inflated enclosure, so constructed and arranged that a sound pulse having a frequency of $$\frac{20\sqrt{P+34}}{d}$$

cycles per second is created.

4. A high amplitude, short pulse, narrow band low frequency underwater sound generator comprising:

(a) an elastic enclosure mounted on a depth charge assembly;

(b) a hydrostatic pressure reactive mechanism adapted for operation at a predetermined depth in combination with a triggering mechanism responsive to the operation of said pressure reactive mechanism responsive to the operation of said pressure reactive mechanism located in said assembly;

(c) a gas pressure reservoir mounted in said assembly and adapted to be released by said triggering mechanism and to inflate said elastic enclosure isothermally until it ruptures at its elastic limit "$d$" and at a predetermined depth "$P$";

(d) so constructed and arranged that a free oscillating bubble is released having a frequency in cycles per second equal to $$\frac{20\sqrt{P+34}}{d}$$

where "$P$" is a predetermined depth in feet and "$d$" is a diameter in inches.

5. A sound generator as in claim 4 wherein; said means connected to said enclosure for inflating said enclosure comprises:

(a) a source of inflating gas located outside said enclosure, said gas remaining at a constant temperature during said inflating.

6. A high amplitude, short pulse, narrow band low frequency underwater sound generator comprising:

(a) an elastic enclosure in the form of an elongated tube;

(b) means connected to said tube for submerging said tube to a predetermined depth "$P$" in a substantially non-compressible liquid;

(c) inflating means connected to said enclosure for inflating said tube to its elastic limit "$d$" isothermally at said predetermined depth and rupturing the inflated enclosure;

(d) so constructed and arranged that an oscillating bubble is released as a source of narrow band, low frequency acoustic wave energy with directivity in a plane at right angles to the axis of said tube wherein the frequency is directly proportional to the depth in feet "$P$" in the medium at which the enclosure is inflated and inversely proportional to the diameter "$d$" of the enclosure at the elastic limit of the enclosure.

7. The method of generating a high amplitude, short pulse acoustic wave in a liquid medium, said wave having a narrow band low frequency equal to $$\frac{20\sqrt{P+34}}{d}$$

cycles per second where "$P$" is a predetermined depth in a liquid medium in feet and "$d$" is a diameter in inches comprising:

(a) submerging an elastic enclosure underwater to a predetermined depth "$P$";

(b) inflating said elastic enclosure at said depth "$P$" until said enclosure reaches a predetermined diameter of "$d$" representing its elastic limit;

(c) and finally rupturing said enclosure at its elastic limit, isothermally, to release an oscillating bubble at said depth "$P$" having a frequency "$f$" equal to $$\frac{20\sqrt{P+34}}{d}$$

cycles per second.

8. A high amplitude, short pulse, narrow band, low frequency underwater sound generator comprising:

(a) a spherical elastic enclosure having a diameter "$d$" in inches when expanded to its elastic limit;

(b) means for supporting said enclosure and submerging said enclosure to a predetermined depth "$P$" in a liquid medium;

(c) gas supply means connected to said enclosure for inflating said enclosure underwater isothermally at said depth "$P$" to its elastic limit and thereafter rupturing the inflated enclosure when it attains said diameter "$d$";

(d) so constructed and arranged that a sound pulse having a frequency equal to $$\frac{20\sqrt{P+34}}{d}$$

cycles per second is created.

References Cited in the file of this patent

UNITED STATES PATENTS

| | | |
|---|---|---|
| 1,247,809 | Foster | Nov. 27, 1917 |
| 2,586,706 | Parr | Feb. 19, 1952 |
| 2,679,205 | Piety | May 25, 1954 |